Jan. 15, 1974  R. G. PEET ET AL  3,786,127
STRETCHING POLYETHYLENE TEREPHTHALATE
FILM IN A SHORTENED SPAN
Filed Jan. 28, 1971  5 Sheets-Sheet 1

ROBERT G. PEET
HENRY O. FOSTER
KENNETH G. PAULSELL   INVENTORS
THOMAS H. HOGSHEAD, JR.

BY  Hoge T. Sutherland

ATTORNEY

INVENTORS
ROBERT G. PEET
HENRY O. FOSTER
KENNETH G. PAULSELL
THOMAS H. HOGSHEAD, JR.

ATTORNEY

United States Patent Office 3,786,127
Patented Jan. 15, 1974

3,786,127
STRETCHING POLYETHYLENE TEREPHTHALATE FILM IN A SHORTENED SPAN
Robert G. Peet, Circleville, Ohio, and Henry O. Foster, Newark, Kenneth G. Paulsell, Wilmington, and Thomas H. Hogshead, Jr., Centerville, Del., assignors to E. I. du Pont de Nemours and Company, Wilmington, Del.
Continuation-in-part of application Ser. No. 101,116, Dec. 23, 1970, which is a continuation of application Ser. No. 844,140, July 23, 1969, both now abandoned. This application Jan. 28, 1971, Ser. No. 110,683
Int. Cl. B29d 7/24
U.S. Cl. 264—288                             8 Claims

ABSTRACT OF THE DISCLOSURE

A method of stretching a web of thermoplastic polymeric film having thickness (i.e., gauge) variations therein. The web is heated to an elevated temperature by indirect (i.e., non-contacting) heating means and stretched as it moves between slow and fast steps of nip rolls. The elevated temperature to which the web is heated is between a minimum temperature and a maximum temperature determined, in part, by the stretching rate and substantially all of the stretching takes place in a shortened stretching span between the heating means and the fast set of nip rolls. The heating means is positioned closely adjacent the fast set of nip rolls, which fast rolls preferably quench the web below its glass transition temperature and define, with the heating means, the shortened stretching span.

Apparatus is provided for performing the above-described method.

CROSS-REFERENCE TO RELATED APPLICATIONS

This application is a continuation-in-part of U.S. patent application Ser. No. 101,116, filed Dec. 23, 1970, now abandoned, which application is a streamlined continuation application of U.S. patent application Ser. No. 844,140, filed July 23, 1969, now abandoned.

BACKGROUND OF THE INVENTION (1) Field of the invention

This invention is a method of and apparatus for stretching or drawing polymeric film.

In particular, the invention is directed to reducing or minimizing magnification of gauge or thickness variations in a web of polyethylene terephthalate film, during stretching, by bringing the web to a critical high temperature and by stretching it in a shortened stretched span (the distance over which stretching occurs). By so controlling this stretching span and by stretching the web after it is heated to a temperature considerably above that generally used in this art, gauge variations in the web before stretching (which would tend to become much larger or thicker when compared to the rest of the web if normal stretching practices were used) are not appreciably changed or magnified relative to the rest of the web, after stretching.

(2) Description of the prior art

U.S. Pat. 2,547,763 to Land discloses longitudinal drawing of a film over a shortened span to minimize width loss of the film and to control uniaxial orientation but discloses nothing relating to gauge variation or controlling magnification of such gauge variations by drawing over a shortened span at critical temperatures.

U.S. Pat. 2,804,652 to Balkan discloses a method of stretching a web of plastic material while preventing substantial narrowing of such material by heating the central portion of the web only while U.S. Pat. 2,854,697 to Ryan discloses stretching over a shortened span but teaches nothing relating to the relationship between temperature and this span to control magnification of gauge variations. And, lastly, U.S. Pat. 2,767,435 to Alles discloses drawing over a shortened span but, like the Ryan patent, above mentioned, has nothing to do with gauge variation magnification control.

SUMMARY OF THE INVENTION

This invention is a novel method of and apparatus for stretching film and, more particularly, is directed to stretching a web of thermoplastic polymeric film longitudinally using high temperatures and a shortened stretching span to orient the web at least in one direction, with such orientation being accomplished without magnifying substantially the existing gauge variations (i.e., zones or areas or sections of different thickness than general web thickness) in the web. This is desirable because excessive magnification of these gauge variations, among other things, adversely affects the capacity of the film to be stretched in the orthogonal direction.

Due to nature of the casting process, a web of plastic film usually has one or more zones or sections of greater or lesser thickness than the rest of the web (i.e., gauge variations) that exist in the cross machine direction of the web. Surges at the extrusion orifice lip of the web forming apparatus, for example, can cause these transverse thickened zones or areas which may appear randomly or cyclically. Thickened zones also may exist in the machine direction of the web but, unlike the cross machine direction zones or gauge variations, they are fairly easy to control by varying or adjusting the extrusion orifice lip or by oscillating the web, for example. The problem is controlling the cross machine gauge variations in the web and, even more difficult, is preventing magnification of these variations during subsequent stretching operations.

It is well known that stretching thermoplastic film as conventionally practiced generally causes magnification of gauge variations, or an increase in the percentage deviation from the mean or average thickness of a film in certain areas or zones of the film. Such increases are an essential outgrowth of the stretching process and the complexity of the relationships and limitations of property-controlling phenomena of the stretching step have offered little hope that gauge variation magnification can be reduced or eliminated.

It is postulated that gauge variation magnification, i.e., an increase in the ratio of the thickness of thick bands or areas to the mean thickness, and conversely, a decrease in the ratio of the thickness of thin bands or areas to the mean thickness, occurs because the thinner areas stretch more easily than the thicker so that differences in thickness, in practice, are always greater after stretching than before.

It is further postulated that gauge variation magnification occurs upon simultaneously applying stretching tension to thick and thin areas; the thin areas may stretch and decrease in thickness, while the gauge of thicker portions may decrease substantially less. Thus, gauge differences or variations between thick and thin portions of the film are magnified.

The present invention provides a critical combination of conditions of stretching in which gauge variation magnification is substantially reduced. These conditions involve stretching the film such that the span over which actual elongation occurs is a predetermined and relatively short distance. Further, it has been discovered that the stretching must be carried out at a much higher temperature than that conventionally employed; the conventional temperature is just above but near the glass transition temperature. The high temperature and the short stretching span of the present invention necessitate indirect or non-contacting heating, preferably by means of a radiant source. The film which is adapted to the mehtod of the present invention before stretching is substantially amorphous. Such film easily sticks on contact with a surface at a temperature much above its glass transition temperature, thereby necessitating a non-contacting heat source.

The invention is exemplified by the stretching of polyethylene terephthalate, but it may be applied to other synthetic polymeric films having a similar drawing and crystallization or stress-strain behavior, such as other polyesters, polycarbonates and the like.

It will be seen that such invention solves the problem of gauge variation magnification caused by stretching plastic film existent in the prior art by providing a novel method of stretching a web of plastic film in a shortened span at critical temperatures to produce a film having desirable characteristics while still preevnting troublesome magnification of gauge variations in such web.

DESCRIPTION OF THE PREFERRED EMBODIMENT

This invention is particularly adapted to improving the physical properties of polyester film, such as polyethylene terephthalate film, by stretching. Such stretched film inherently has a number of excellent physical properties which make it useful in a great variety of applications; i.e., packaging, electrical applications, protective coverings, and the like.

Referring to the drawing, there is shown an apparatus 10 of this invention for stretching a web W of film, such as polyethylene terephthalate film, to provide film having enhanced physical properties.

Figure 1:
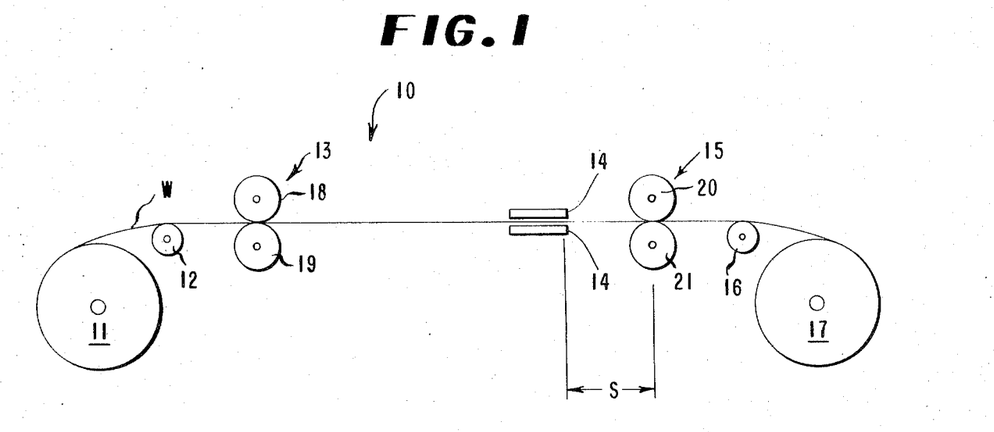
FIG. 1 is a diagrammatic view of the film stretching apparatus of this invention showing a web of film as it moves from a supply source through a slow set of nip rolls, past a non-contacting heating means, through a fast set of nip rolls and onto a windup roll; the heating means being positioned closely adjacent the fast set of nip rolls and defining therebetween a shortened stretching span.
Figure 2:
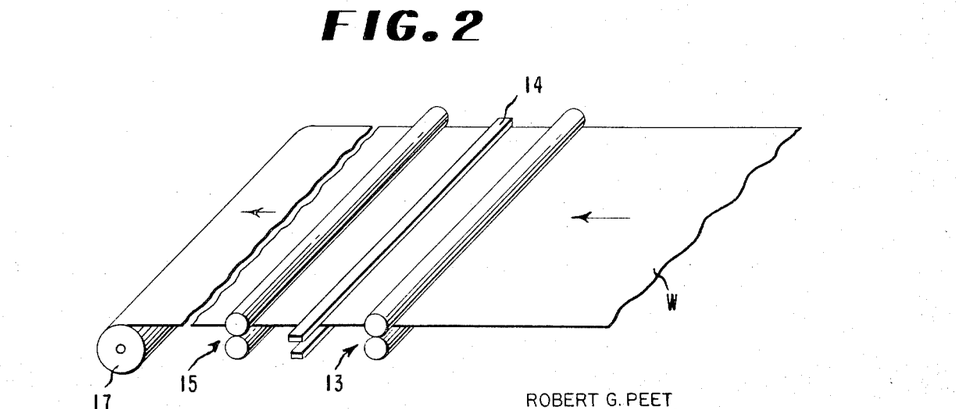
FIG. 2 is a fragmentary perspective view, with parts omitted for clarity, showing the slow and fast sets of nip rolls with the heating means positioned therebetween and the windup roll onto which the web of plastic film is wound.

Referring to FIG. 1 in particular, it will be seen that the web W of material to be stretched by stretching apparatus 10 is supplied from a supply source 11 and moved over a support roll 12 and into the nip of a first set of nip rolls 13, hence into operative association with a heating means 14 and, after heating, into the nip of a second set of nip rolls 15, then over a support roll 16 and into a windup roll 17.

The supply source 11 may be any appropriate source such as a supply roll or a web of plastic film as it emerges from a polyethylene terephthalate film casting operation, for example.

The first set of nip rolls 13 (so-called "slow rolls") consists of an upper nip roll 18 and a lower nip roll 19 which is driven at a first speed by appropriate means (not shown), and the second set of nip rolls 15 (so-called "fast rolls") consists of an upper nip roll 20 and a lower nip roll 21 which is driven at a second speed faster than the first speed whereby to apply stretching forces to the web W.

As the web W moves past the heating means 14, in the form of indirect or non-contacting heating means parts positioned above and below the web W and spaced from it, the web is heated to a critical stretching temperature considerably above its glass transition temperature. By heating web W, it is rendered more ductile and readily deformable or stretchable and substantially all of the stretching occurs after heating; that is, in a shortened span S between the heating means 14 and the fast set of nip rolls 15. In this shortened span S and at this critical temperature, the web W may be stretched effectively to orient it while maintaining any gauge variations in the web W substantially as they were before stretching, as will be further explained. The stretching of the web W is brought about by the speed difference between the slow and fast sets of nip rolls 13 and 15 and the extent of longitudinal stretching is determined by this difference in the linear speed of such rolls, in a manner known to the art.

After the plastic web W is stretched in this manner, it may then be wound onto the windup roll 17 for future use or may be further processed; e.g., stretched in its transverse direction.

In continuously stretching polyethylene terephthalate film in an apparatus of the type described, the film preferably is stretched at rates at least 50,000% per minute and, generally, within the range from 100,000% to 1,000,000% per minute. Obviously, in a continuous process, the highest rates are desirable in order to obtain good orientation and a high rate of film production and stretching rates as high as 2,000,000% per minute have been used in the present method. Hence, the method of the present invention defines the critical conditions for obtaining, at high stretching rates, oriented polyethylene terephthalate film having desirable physical, chemical and electrical properties and greatly improved gauge. In the stretching apparatus described hereinbefore, the stretching rate is determined by web speed, stretch ratio and stretching span.

The term "stretching rate" or "rate of stretching" as used in this application means the rate at which the web is elongated in the span where the stretching is actually accomplished (i.e., in the shortened span S between and defined by the non-contacting heating means 14 and the fast set of nip rolls 15). A typical example for calculating rate of stretching or draw is shown in U.S. Pat. 3,214,503 to Markwood.

It is known to the art to stretch film in a short span. Generally, in such stretching practices, the film is heated directly by slow nip rolls prior to being stretched by fast nip rolls. The stretching temperature is limited by the direct contact between the film and the slow nip rolls and the stretching span is limited by the sum of the radii of the slow and fast nip rolls. Short span stretching, as hitherto practiced, has afforded improvements in width control and orientation, but generally has sacrificed gauge uniformity.

In the present invention, it has been found, surprisingly, that by heating a web of plastic film with radiant or non-contacting heat by heating means positioned between the slow and fast nip rolls and raising the film temperature to a critical temperature above the normal temperature for stretching (the normal temperature for stretching is slightly above the glass transition temperature), gauge magnification can be reduced to a value substantially below that hitherto attainable. Temperatures required to effect this gauge improvement, in films such as polyethylene terephthalate, necessitate indirect heating means to prevent the film from sticking to heated rolls, for example, which occurs if amorphous film contacts a heated surface much above the glass transition temperature of the polymer.

Stretching for molecular orientation requires elongation of a film beyond its elastic yield point, i.e., to an irreversible extent, at a temperature which affords sufficient molecular mobility to permit molecular alignment and ordering without rupturing molecular chains. At higher temperatures, however, molecular motions may become so free that orientation does not occur. Therefore, it is the practice to stretch at a temperature as low as possible and over a relatively long span; however, such stretching is generally characterized by high gauge variation magnification.

Further, if the temperature is low, stretching over a short span generally also will cause high gauge variation magnification, but, surprisingly, it has been found that by stretching at higher temperatures over a short span between non-contacting heating means and fast nip rolls, gauge variation magnification is minimized; that is the crux of the invention.

As a critical requirement for continuous stretching of polyethylene terephthalate film by the method of this invention with a minimum of magnification of gauge variations existing in the film, longitudinal stretching must be carried out at a minimum temperature of at least about 90° C. This minimum temperature, which is considerably above normal stretching temperatures, i.e., near the glass transition temperature of around 80° C., has been determined by the discovery that using this higher temperature in shortened span stretching as previously described solves or aids in solving gauge variation magnification problems.

The invention may be more clearly understood by referring to the graphic showings of the drawing and the utility it brings to the art will be apparent from these showings. The primary advantage lies in the improvement in minimizing magnification of gauge variations in the web, during stretching, which is shown in the drawing as "gauge magnification ratio," and which ratio is based on "gauge variation" in the web W before and after stretching.

Gauge variation (V), as a percentage, is determined by measuring the thickness of the web of film along its length in the machine direction and substituting in the following equation:

$$V = \frac{t_2 - t_1}{t_0} \times 100$$

wherein $t_2$ is the thickness of the thickest section, $t_1$ is the thickness of the thinnest section, and $t_0$ is the average thickness of the web. This percentage calculation is based upon a predetermined number of thicknesses measurements of the web, as described, for example, in U.S. Pat. 2,851,733 to Pangonis et al. Values of gauge variation greater than 10% cannot be tolerated in commercial practice.

Gauge magnification ratio is defined as $V_s/V_i$ wherein $V_s$ is the gauge variation (percent) in the final stretched web, and $V_i$ is the gauge variation (percent) in the initial extruded or cast web. Values of gauge variation magnification preferably should approach unity, which value indicates little or no effect on gauge variation magnification caused by stretching.

Figure 3:
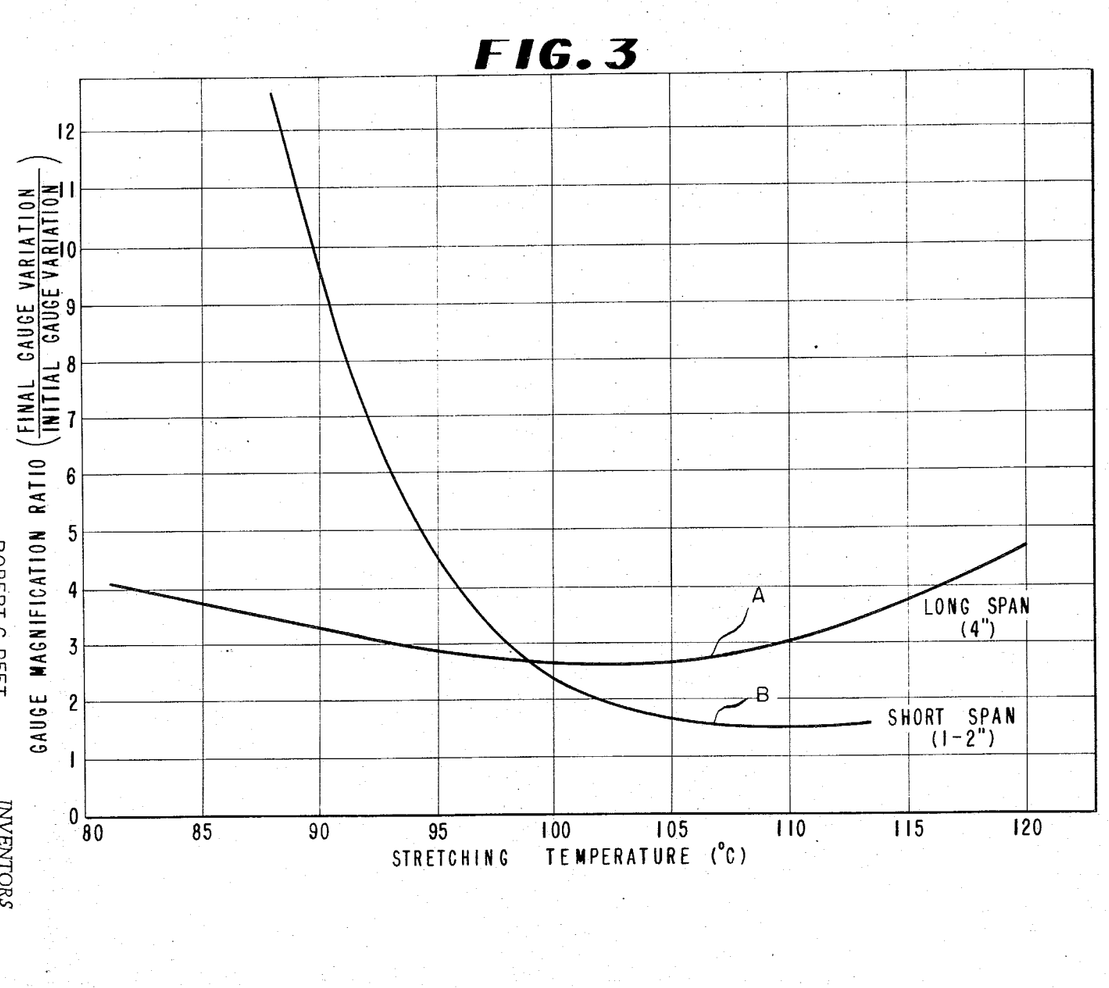
FIG. 3 is a graph illustrating the effect of stretching temperature and stretching span on magnification of gauge variations (expressed in terms of gauge magnification ratio) in polyethylene terephthalate film samples, pointing up the improvements derived by the practice of this invention.

The utility of this invention may be observed in FIG. 3, for example, from a plot showing gauge magnification ratio (final gauge variation $V_s$ in the stretched web divided by initial gauge variation $V_i$ in the extruded or cast web) against stretching temperature and comparing short span (i.e., the span S between the heating means 14 and the fast set of nip rolls 15) and long span stretching, at constant web speeds. It will be seen that dramatic improvements occur in short span stretching (see the curve designated B) at stretching temperatures starting around between 95° C. and 100° C., as compared to long span stretching (see the curve designated A) under similar conditions.

The minimum stretching temperature depends upon the polymer. For example, the minimum temperature above which stretching is caried out for polyethylene terephthalate is within the range of 90° C. to 160° C. as hereinafter described. Hence, the first direction or longitudinal stretching of this invention must be carried out above this critical minimum temperature in a shortened span so that the film draws homogeneously over the entire area of the film under tension and gauge variation magnification is thereby minimized.

The effective stretching temperatures (minimum and maximum) used in the practice of this invention are dependent on the stretching rate.

Figure 4:
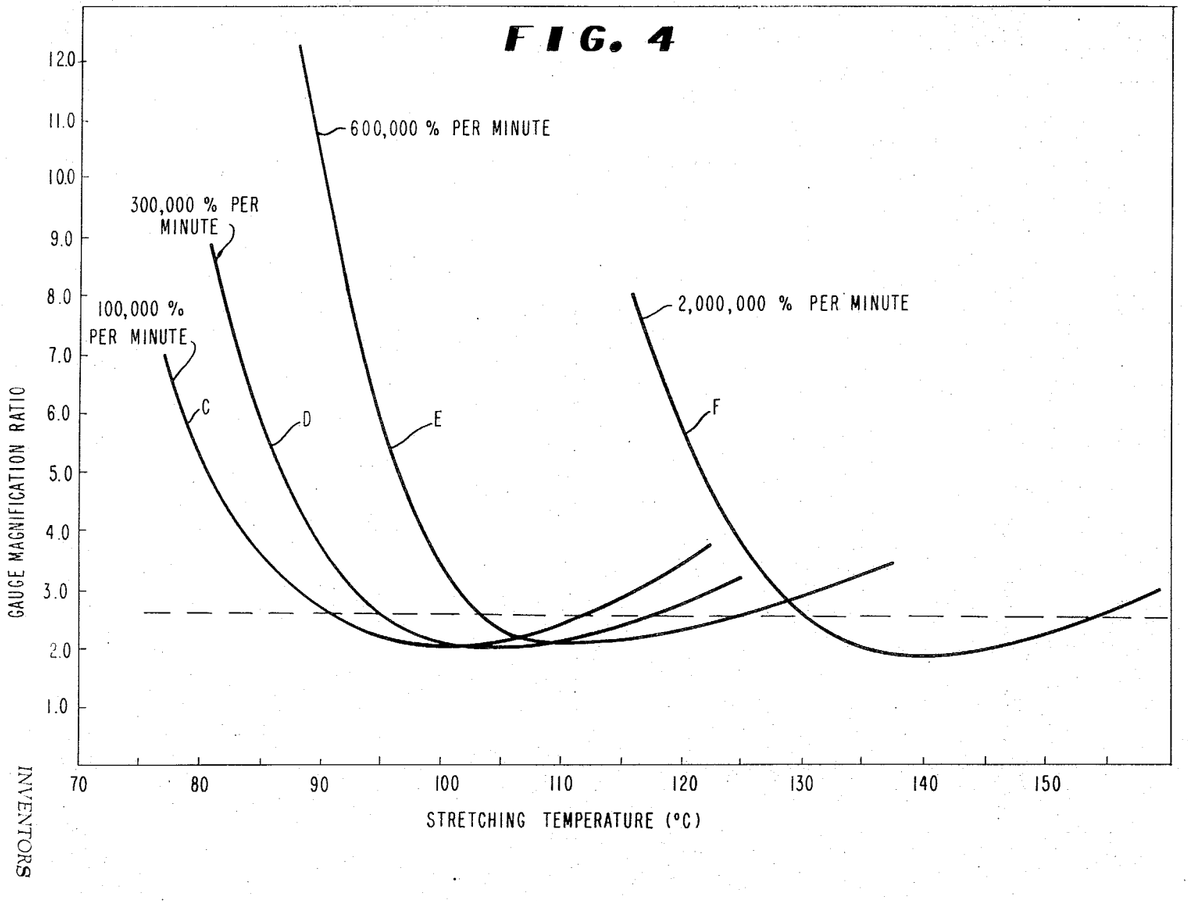
FIG. 4 is a graphic illustration of the effect of stretching rate at various stretching temperatures on gauge variation magnification (i.e., gauge magnification ratio) in polyethylene terephthalate film samples.
Figure 5:
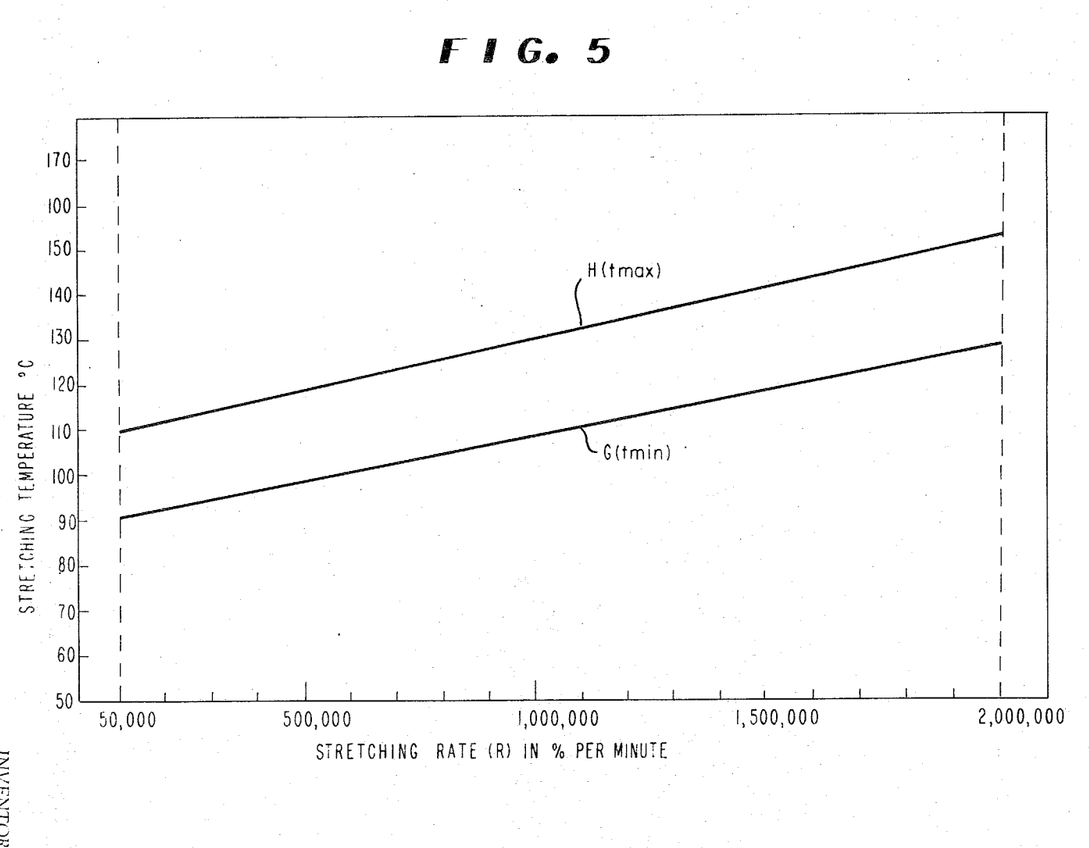
FIG. 5 is a graphic illutsration of the relationship between stretching rate and stretching temperature for such film.

FIG. 4 shows that as the stretching rate R increases— wherein curves C, D, E and F, represent polyethylene terephthalate film samples stretched in the same short span S at 100,000, 300,000, 600,000 and 2,000,000 percent per minute stretching rates, respectively—higher temperatures are required to effect a reduction in the gauge magnification ratio at such higher rates. As shown in FIG. 3, a gauge magnification ratio of about 2.5 represents the point where improvement occurs in short span stretching according to this invention as compared to stretching over a longer span. Using this value of gauge magnification ratio (i.e., 2.5) as a basis has provided the relationship as represented by line G of FIG. 5. This line represents the effective minimum film temperature for the method of this invention as a function of the stretching rate. The linear plot yields the following relationship between these two variables:

$$t_{min.} = 89° \text{ C.} + (2.1 \times 10^{-5})R$$

where $t_{min.}$ = minimum temperature (° C.) of film at initiation of stretch, and R = the rate of stretching in percent (%) per minute.

Further, FIG. 4 shows that after passing through a minimum gauge magnification ratio, for each rate of stretching, as the stretching temperature increases, the gauge magnification ratio increases as a result of the stretching at these higher temperatures. A plot of the upper temperature where the gauge magnification ratio rises above 2.5 for any stretching rate is represented by line H of FIG. 5 which defines the maximum stretching temperature for the method of this invention as a function of the rate of stretching. This is expressed by the relationship $$t_{max.} = 109° \text{ C.} + (2.3 \times 10^{-5})R$$

where $t_{max.}$ = maximum temperature (° C.) at initiation of stretch, and

R = the rate of stretching in percent (%) per minute.

Accordingly, the area bounded by the minimum and maximum temperature limits, as shown in FIG. 5, defines the effective operating conditions with respect to temperature and stretching rate in accordance with the present invention.

The utility of this invention has been illustrated by a series of experiments which revealed the necessity for high stretching temperature to enable realization of the benefits of short span stretching in reducing gauge variation magnification over the entire range of operations.

In these experiments, as depicted in FIG. 3, cast polyethylene terephthalate films (substantially free of orientation and crystallinity) were stretched by using nip rolls, as shown, for example, in FIG. 1, in which the unstretched film was first engaged by a slow set of nip rolls, moved in a free span, then engaged by a fast set of nip rolls moving faster than the slow set of rolls by a factor equal to the draw or stretch ratio. For orientation, the film in web form was heated by a juxtaposed pair of electric radiant heaters above and below the film or web in the free span between the slow and fast sets of nip rolls. The film temperature was controlled by the electric power input to the heaters, and measured by a Barnes "Optitherm," positioned to measure the temperature of the film after it emerged from the gap between the heaters. The film reached its highest temperature along the line of emergence from the heaters whereupon stretching was initiated and, after stretching, the web was quickly cooled to a temperature below the glass transition temperature in the fast set of nip rolls. Accordingly, the film reaches its yield point on emergence from the heaters, where stretching was initiated; the entire extent of stretching occurred in the shortened stretching span S between the heaters and the fast set of nip rolls. The stretching span, therefore, was adjustable as the distance from the line of emergence from the heaters to the line of engagement into the fast set of nip rolls. Samples of film used in the experiments had a repeating gauge defect with a longitudinal extent of approximately 3.3 inches; they were stretched 3.4 times the initial length. The curves in FIG. 3 illustrate the results of stretching in which the relative gauge magnification ratio of long span stretching (4 inches in this example), generally designated A, and short span stretching (1 to 2 inches in this example), generally designated B, is shown as a function of temperature. From these curves it can be seen that short span stretching (1 to 2 inches) at a temperature above approximately 90° C. is more effective in reducing the gauge magnification ratio. This temperature is approximately 10° C. above the glass transition temperature of the amorphous polyethylene terephthalate film used for production of oriented film. It will be noted that while stretching at temperatures above 90° C. in the short span S provides an improved gauge magnification ratio, stretching in this same span at below this critical temperature or at 80° to 90° C. gives an excessively poor gauge magnification ratio.

Similar stretching of film having the isolated transverse ridges will reduce gauge magnification ratio caused by stretching if the stretching span is less than the longitudinal extent of the isolated or random gauge defect. With gauge variations of a cyclic or repeat nature, the gauge magnification ratio reduction becomes very significant if the stretching span is reduced below the average peak-to-peak distance between defects measured before and after stretching.

Figure 6:
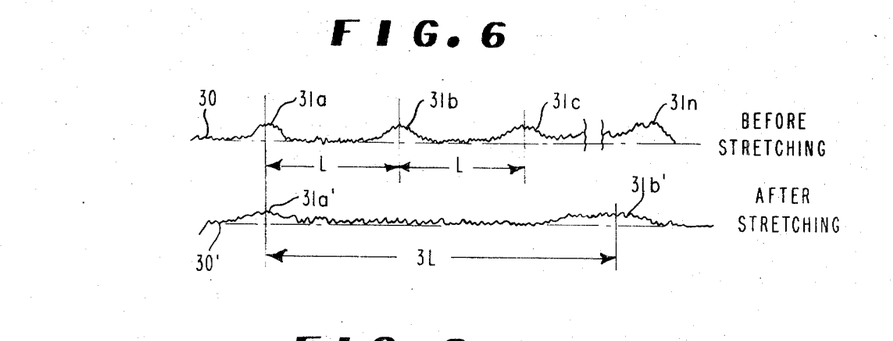
FIGS. 6 and 6a are illustrations of a type of gauge variation reduced or minimized by the present invention.
Figure 6A:
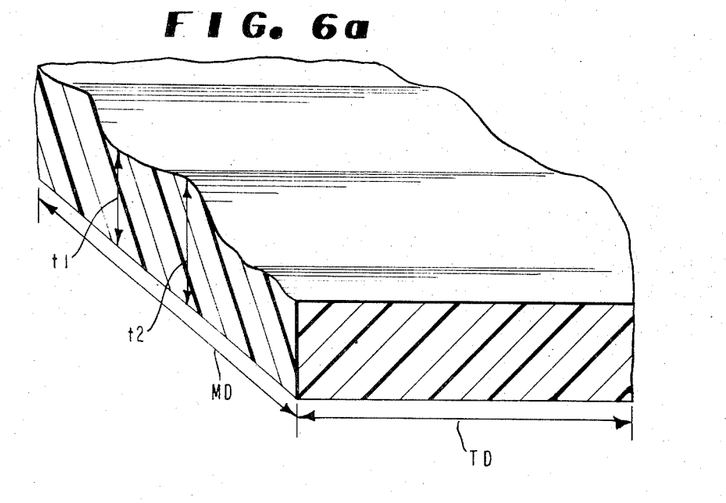

The determination of the length of the span S for stretching a web of plastic film with repetitive sections of varying thickness measured along the length of the web (as distinguished from gauge bands, which are variations in thickness or gauge measured between the lateral edges of the film) is illustrated in FIGS. 6 and 6a.

In FIG. 6 is seen a gauge trace 30 measured along the longitudinal axis of a web of film, before stretching, made by one of the well known techniques such as an electromicrograph or a beta-ray gauge coupled through appropriate circuits to a strip-chart recorder, which trace is representative of thickness or gauge variations in the unstretched web. Shown are repetitive gauge variations 31a, 31b, 31c, . . . 31n, which originate in the source of the film, such as in cyclic variations in polymer pressure at the point of extrusion or in perturbations in the motion of the casting drum caused by eccentricity. The distance between these gauge variations before stretching is indicated by L. Similarly, after stretching 3× (three times the initial length of the film), trace 30', shows the distance between 31a' and 31b' as 3L. Hence, the stretching span S, according to the present invention, should be the average before and after stretching (3 times film length) as calculated below:

$$\frac{3L+L}{2} = 2L = \text{maximum effective length of stretching span S}$$

For example, a stretching span S length of 3.0 inches is effective in reducing gauge variation magnification of a web having a cast film peak-to-peak defect distance of 2.0 inches, if the web is stretched 3.4 times its initial length, i.e., a peak-to-peak distance after drawing of 6.8 inches, or a 4.4 inch average of drawn and cast distance.

In a manner similar to the determination of span S length to cope with repetitive gauge variations, the effective length of the stretching span S also may be determined for random, more persistent gauge variations which occur.

Figure 7:
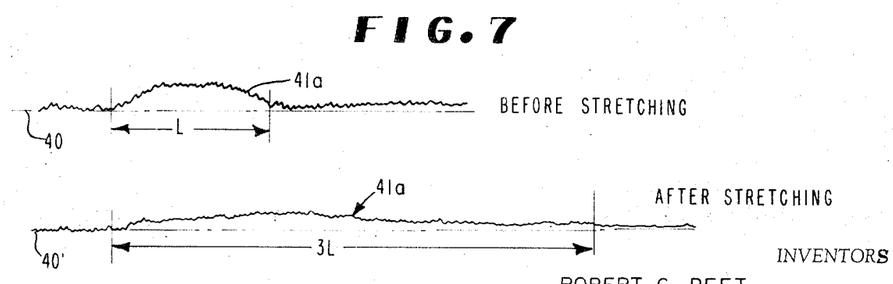
FIG. 7 is a graphic illustration of a second type of gauge variation reduced or minimized by the present invention.

FIG. 7 illustrates a gauge trace 40 measured along the longitudinal axis of a web, before stretching, having isolated gauge variation 41a with longitudinal extent L; after stretching 3×, trace 40' shows this same isolated gauge variation 41a to have longitudinal extent 3L, or $$\frac{3L+L}{2} = 2L = \text{maximum effective length of stretching span S}$$

It should be pointed out that the shorter the stretching span S, the more effective the reduction in gauge variation magnification; the reduction in magnification changes continuously with span reduction, but the minimum practicable span is determined by the spatial limitations of the equipment.

It has been observed in stretching polyethylene terephthalate film that at high speeds machine direction (MD) magnification of gauge variations will rise to levels that are intolerable if the MD stretching temperature is restricted to the current maximum for conventional nip roll stretching apparatus of about 87° C., at which temperature cast film starts to stick to rolls. Utilization of a non-contacting heating concept, such as this invention provides, in thus required to permit realization of stretching temperatures high enough to prohibit gauge variation magnification at high rates of stretching.

Improved gauge properties in polyethylene terephthalate film made in accordance with this invention is attained as a result of the short MD stretching span S and the higher allowable stretching temperatures. In addition, the greater flexibility in process conditions, combined with the stretching control which the method of this invention provides allow better control over orientation and crystallinity produced during MD stretching. The potential benefits of this increased control include improved runnability, higher strength, and improved product uniformity.

In stretching polyethylene terephthalate film in accordance with this invention, the slow nip rolls 18 and 19 preferably are heated by any conventional means to a temperature such that they will bring the web or film as it passes therethrough to a non-stretching temperature below its glass transition temperature or second order transition temperature and less than a temperature (around 87° C.) at which it would stick to the rolls. The non-contacting heating means 14 then further heats the film or web W to a temperature of at least over about 90° C. (i.e., to the critical stretching temperature) and the fast nip rolls 20 and 21, thereafter, reduce the temperature of the film or web W to below the glass transition temperature of the film, and preferably to around 60° C. The expression "glass transition temperature" or "second order transition temperature" as used in this application is that temperature at which a discontinuity occurs in the curve of a first derivative thermodynamic quantity with temperature as further defined, for example, in U.S. Pat. 2,578,899 to Pace.

As stated in the method of this invention, molten polyethylene terephthalate film is cast under conditions such that the formed film, when solid, is substantially amorphous. This is conveniently accomplished by extruding the melt at a temperature of 270° C. to 315° C. onto a casting drum maintained at a temperature sufficiently low (preferably below 60° C.) to effect rapid quenching or chilling of the polymer from the molten state such as is conventional in the art.

Preferably, this cast film, substantially free of crystallization and orientation, is then heated to a temperature between 70° C. and 80° C. by the slow nip rolls 18 and 19, which rolls are heated by appropriate means, not shown. The maximum temperature to which the film may be heated by these slow nip rolls 18 and 19 is that temperature at which the film will not stick to such heated rolls (i.e., somewhat below around 87° C. for polyethylene terephthalate film) and at which the film will not stretch (i.e., the glass transition temperature of such film).

The non-contacting heaters 14 then heat the web W of polyethylene terephthalate to the appropriate stretching temperature (over 90° C.) and the difference in the film temperature at this point and at the slow rolls 13 may for purposes of this application be termed as the "induced temperature rise."

The fast nip rolls 20 and 21 are cooled by appropriate means (not shown) whereby they rapidly will bring the web W to a temperature below its glass transition temperature upon contact of the web W with such rolls. It is important to stress that these fast nip rolls 20 and 21 (one is rubber-covered; the other a steel roll) preferably perform a dual function: in contacting and gripping the web W between them, they (1) terminate the stretching at the instant the web enters the nip between the rolls and (2) cool the web to below its glass transition temperature, and preferably around 60° C., in a preferred embodiment. This line or contact gripping by the fast nip rolls 20 and 21 provides for a definitive, unragged, termination of the shortened stretching span S and the concomitant termination of stretching tension upon release, of exiting, of the web from the nip between these rolls, together with the simultaneous cooling by such rolls, is a unique aspect of this invention.

In brief summary, then, the web W as it leaves the slow rolls 13 is, and must be, at a non-stretching, non-sticking temperature below its glass transition temperature, it is then subjected to an induced temperature rise by the non-contacting heaters 14 to raise its temperature to a critical stretching temperature above its glass transition temperature, after which it preferably is cooled below its glass transition temperature again by the fast set of nip rolls 15 which also mark the termination of stretching tension.

An additional important feature of this invention is that the critical stretching temperature (i.e., the temperature of the film at the start of stretching) brought about by the non-contacting heaters 14 preferably should be attained before the stretching begins. This may be accomplished by driving the slow and fast set of nip rolls 13 and 15 at the same first speed until the film reaches this critical temperature and, thereafter, driving the fast set of nip rolls 15 at the second speed faster than this first speed to generate the stretching forces.

In the preferred embodiment of the method of this invention there is a minimum entering film temperature, a maximum induced temperature rise, and the heating means 14 is positioned as close as possible to the fast nip rolls 15. The combination of stretching temperature and draw or stretching ratio is selected to give the desired film orientation, at a crystallinity level compatible with good runnability of the integrated process line. Typical values of preferred operation are 70° C. slow roll temperature, 25° C. induced temperature rise, the heating zone or means exit less than 3 inches from the fast nip roll centerline and a draw ratio of 2.6 to 4.0 depending on the film properties desired.

Hence, it is seen there is provided a method of continuously stretching a web of polyethylene terephthalate film including the steps of:

moving an unstretched web of such film, substantially free of orientation and crystallization, into the nip of a first set of nip rolls, then into operative association with a heating means and, thereafter, into the nip of a section set of nip rolls;

heating the web by the heating means to a stretching temperature at least 10° C. above its normal temperature for stretching, which normal temperature is above the glass transition temperature of the web and below a higher temperature above which molecular orientation does not occur, the heating taking place after the web has left the first set of nip rolls and before it enters the second set of nip rolls, the heating means being spaced from the web and in non-contacting relationship with respect thereto and the web reaching its yield point on emergence from the heating means; and stretching the web longitudinally to orient it at a stretching rate within the range from 50,000% to 2,000,000% per minute with substantially all of the stretching occurring after heating and in a shortened span between and defined by the heating means and the second set of nip rolls, the first set of nip rolls being driven at a first speed and the second set of nip rolls being driven at a second speed faster than the first speed whereby to apply stretching forces to the web.

This method further includes the step of quenching the web below the glass transition temperature of the web by means of the second set of nip rolls.

Again, in this inventive method the fast set of nip rolls 15 play the dual and key role of positively terminating stretching tension while simultaneously cooling the web being stretched.

And lastly, and as described, inventive apparatus is provided for performing the method of this invention with its critical stretching span being defined by and between non-contacting heating means and fast (cooling) nip rolls, for enabling the stretching of the web to occur under critical, inventive conditions.

It will be recognized, by one skilled in the art, that the precise conditions employed in practicing this invention may vary and still be within the scope of the invention.

We claim:

1. A method of continuously stretching a web of polyethylene terephthalate film including the steps of:
   moving an unstretched web of such film, substantially free of orientation and crystallization, into the nip of a first set of nip rolls, then into operative association with a heating means and, thereafter, into the nip of a second set of nip rolls;
   heating the web by means of the first set of nip rolls as it passes therethrough to a temperature of from about 70° C. to less than about 87° C.;
   heating the web by the heating means to a stretching temperature within the range from about 90° C. to 160° C., such heating taking place after the web has left the first set of nip rolls and before it enters the second set of nip rolls, the heating means being spaced from the web and in non-contacting relationship with respect thereto and the web reaching its yield point on emergence from such heating means;
   stretching the web longitudinally to orient it at a stretching rate within the range from 50,000% to 2,000,000% per minute with substantially all of the stretching occurring after such heating and in a shortened span between and defined by such heating means and the second set of nip rolls, the first set of nip rolls being driven at a first speed and the second set of nip rolls being driven at a second speed faster than the first speed whereby to apply stretching forces to the web;
   reducing the temperature of the web to below its glass transition temperature by means of the second set of nip rolls;
   wherein the length of the shortened span S, as shown in FIG. 1, measured from the end of the heating means to the line of contact with the second set of nip rolls is less than the average longitudinal distance between repetitive gauge variations before and after stretching measured peak-to-peak, such gauge variations, as shown in FIG. 6, being zones of different thickness than general web thickness as determined by gauge traces 30 and 30' measured along the longitudinal axis of the web, and being designated 31a, 31b, 31c and 31n before stretching and 31a' and 31b' after stretching, measured at the major peaks of such gauge traces; and wherein the draw ratio is at least 2.6.

2. The method of claim 1 wherein the length of the shortened span is less than 3 inches.

3. The method of claim 1 wherein the gauge magnification ratio of the web is maintained below 2.5, such gauge magnification ratio being the final gauge variation in the stretched web divided by the initial gauge variation in the unstretched web.

4. The method of claim 1 wherein the web is heated between a minimum temperature and a maximum temperature by the heating means, such temperatures being calculated according to the following equations:

$$t_{min.} = 89° \text{ C.} + (2.1 \times 10^{-5})R$$

where $t_{min.}$ = minimum temperature (° C.) of film at initiation of stretching, and
R = the rate of stretching in percent (%) per minute, and $$t_{max.} = 109° \text{ C.} + (2.3 \times 10^{-5})R$$

where $t_{max.}$ = maximum temperature (° C.) at initiation of stretching, and
R = the rate of stretching in percent (%) per minute;

5. The method of claim 1 wherein the length of the shortened span is between 1 and 2 inches.

6. The method of claim 1 wherein the stretching rate is between 100,000% and 1,000,000% per minute.

7. The method of claim 1 wherein the stretching temperature is about 95° C.

8. A method of continuously stretching a web of polyethylene terephthalate film including the steps of:
moving an unstretched web of such film, substantially free of orientation and crystallization, into the nip of a first set of nip rolls, then into operative association with a non-contacting heating means and, thereafter, into the nip of a second set of nip rolls;
engaging the web by the first set of nip rolls and the second set of nip rolls to move the web in a free span therebetween, the first set of nip rolls and the second set of nip rolls each being driven at a first speed;
heating the web by means of the first set of nip rolls as it passes therethrough to a temperature of from about 70° C. to less than about 87° C.;
heating the web by the heating means to a stretching temperature within the range from about 90° C. to 160° C., such heating taking place after the web has left the first set of nip rolls and before it enters the second set of nip rolls, the heating means being spaced from the web and in non-contacting relationship with respect thereto and the web reaching its yield point on emergence from such heating means;
stretching the web longitudinally to orient it at a stretching rate within the range from 50,000% to 2,000,000% per minute with substantially all of the stretching occurring after such heating and in a shortened span between and defined by such heating means and the second set of nip rolls, the second set of nip rolls being driven at a second speed faster than the first speed whereby to apply stretching forces to the web;
reducing the temperature of the web to below its glass transition temperature by means of the second set of nip rolls;
wherein the length of the shortened span S, as shown in FIG. 1, measured from the end of the second set of nip rolls is less than the average longitudinal distance between repetitive gauge variations before and after stretching measured peak-to-peak, such gauge variations, as shown in FIG. 6, being zones of different thickness than general web thickness as determined by gauge traces 30 and 30' measured along the longitudinal axis of the web, and being designated 31a, 31b, 31c and 31n before stretching and 31a' and 31b' after stretching, measured at the major peaks of such gauge traces; and
wherein the draw ratio is at least 2.6.

References Cited

UNITED STATES PATENTS

| | | | |
|---|---|---|---|
| 2,854,697 | 10/1958 | Ryan | 264—288 |
| 3,256,379 | 6/1966 | Heffelfinger | 264—289 |
| 3,161,711 | 12/1964 | Tassler | 264—289 |
| 2,804,652 | 9/1957 | Balkan | 264—289 |
| 3,107,139 | 10/1963 | Cornforth | 264—289 |

FOREIGN PATENTS

| | | | |
|---|---|---|---|
| 890,005 | 2/1962 | Great Britain | 264—288 |
| 1,083,665 | 9/1967 | Great Britain | 264—289 |

ROBERT F. WHITE, Primary Examiner

J. B. LOWE, Assistant Examiner

U.S. Cl. X.R.

264—Dig. 73